United States Patent [19]

Zaretsky et al.

[11] Patent Number: 5,494,619
[45] Date of Patent: Feb. 27, 1996

[54] IMPROVED ELECTROSTATIC PINNING METHOD

[75] Inventors: Mark C. Zaretsky; John E. Benson, both of Rochester, N.Y.

[73] Assignee: Eastman Kodak Company, Rochester, N.Y.

[21] Appl. No.: 324,951

[22] Filed: Oct. 18, 1994

[51] Int. Cl.⁶ .................................................. B29C 39/42
[52] U.S. Cl. ..................... 264/466; 264/216; 425/174.8 E
[58] Field of Search ............. 264/22, 216; 425/174.8 E, 425/174

[56] References Cited

U.S. PATENT DOCUMENTS

| | | | |
|---|---|---|---|
| 2,108,361 | 2/1938 | Asakawa | 18/8 |
| 2,881,470 | 4/1959 | Berthold | 18/1 |
| 3,068,528 | 12/1962 | Owens | 18/48 |
| 3,223,757 | 12/1965 | Owens et al. | 264/22 |
| 3,655,307 | 4/1972 | Hawkins | 425/109 |
| 3,660,549 | 5/1972 | Hawkins | 264/22 |
| 3,686,374 | 8/1972 | Hawkins | 264/22 |
| 3,758,251 | 9/1973 | Gillyns et al. | 264/22 |
| 3,820,929 | 6/1974 | Busby et al. | 425/174.8 |
| 3,892,614 | 7/1975 | Levy | 156/380 |
| 4,129,630 | 12/1978 | Etchu et al. | 264/22 |
| 4,244,894 | 1/1981 | Segransan et al. | 264/22 |
| 4,309,368 | 1/1982 | Groves | 264/22 |
| 4,478,772 | 10/1984 | Takagi et al. | 264/22 |
| 4,534,918 | 8/1985 | Forrest, Jr. | 264/22 |
| 4,997,600 | 3/1991 | Okumura et al. | 264/22 |
| 5,030,393 | 7/1991 | Endo et al. | 264/22 |
| 5,045,248 | 3/1991 | Satterfield et al. | 264/13 |
| 5,186,707 | 2/1993 | Barta | 493/439 |

FOREIGN PATENT DOCUMENTS

| | | | |
|---|---|---|---|
| 63-317316 | 12/1988 | Japan | 425/174 |
| 3-92323 | 4/1991 | Japan | 425/174.8 E |

*Primary Examiner*—Jeffrey R. Thurlow
*Attorney, Agent, or Firm*—Carl F. Ruoff; Arthur H. Rosenstein

[57] ABSTRACT

A process for improving adhesion of a thermoplastic polymeric resin on a casting surface by using an electrostatic pinning wire in conjunction with a conductive shield. The method includes the steps of extrusion casting a sheet of molten polymer from a die, directing the cast sheet onto a moving, chilled and electrically grounded casting surface to solidify the polymer and extending a conductive wire transverse to a longitudinal axis of the sheet with the sheet between the wire and the chilled surface before the sheet contacts the chilled surface. An elongated conductive uninsulated shield parallel to the wire with the wire between the shield and the sheet is provided and a bias voltage is applied to the wire and the shield. The bias voltage of the wire is in the range of 6 to 15 kV, and the bias voltage of the shield is adjusted to be at least 5 kV lower than the voltage of the wire to maintain a desired current flowing from the wire and the shield to the sheet.

4 Claims, 2 Drawing Sheets

IMPROVED ELECTROSTATIC PINNING METHOD

FIELD OF THE INVENTION

The present Invention relates to the casting of polymeric resins using an electrostatic pinning process. More particularly, the present invention uses an electrically biased conductive shield in conjunction with a pinning wire, to improve the pinning of a polymeric resin onto a casting surface.

BACKGROUND OF THE INVENTION

Electrostatic pinning is one method used in the casting of an extruded plastic resin to a surface. A pinning wire is raised to a high voltage such that it ionizes the air around it, creating a corona discharge. Ions of the same polarity as the wire are repelled towards the resin and, hence, electrostatically charge the resin. The electrostatic charge, in combination with the ground plane provided by the casting surface, exerts an electrostatic force on the resin that improves its contact with the casting surface, resulting in films that are rapidly quenched and free of defects. This is especially important at increased casting speeds where air entrainment between the resin and the casting surface would otherwise result in film nonuniformities and defects.

The use of an electrostatic pinning wire is described in U.S. Pat. No. 3,223,757. In the process described in this patent, a film forming polymeric material is extruded onto an electrically grounded quenching surface while being passed in close proximity to an electrode. The electrode deposits an electrostatic charge onto the polymeric material before the material has solidified which causes the material to adhere firmly across the width to the quenching surface.

In U.S. Pat. Nos. 3,655,307; 3,660,549; and 3,686,374, a method is disclosed for improving the high speed performance of electrostatic pinning by using a grounded shield in the shape of a semi-cylinder that is covered with an insulating layer. The second electrode gets charged from the pinning wire tending to push the ions towards the resin. In addition, a gas may be introduced that serves to raise the sparkover voltage, the voltage at which the electrode discharges onto the wheel or the die.

In U.S. Pat. No. 3,820,929, a second wire is electrically connected to the pinning wire. It is of a larger diameter so as not to emit ions, hence, it serves in a similar capacity as the dielectric shield mentioned in the above paragraph except the geometry is more limited.

In U.S. Pat. No. 4,129,630 a non-grounded shield, conductive or non-conductive and of variable geometry, is interposed between the pinning wire and the extrusion die, and claimed to improve pinning due to improved electric field uniformity resulting from decreased contamination of the pinning wire with sublimate from the die.

A semi-cylindrical, grounded conductive shield is disclosed in U.S. Pat. No. 4,244,894. This patent asserts that at a given pinning wire voltage, more charge is delivered to the resin with a grounded shield than with other configurations.

In U.S. Pat. No. 4,534,918, a second electrode consisting of grounded pins extended towards the pinning wire is disclosed. This patent claims that these pins improve the uniformity of the charge laid out on the resin resulting in better pinning.

In U.S. Pat. No. 5,030,393, a set of floating conductive electrodes are disposed to either side of the pinning wire. These electrodes perform similarly to the insulating shields mentioned earlier, such as in U.S. Pat. No. 3,655,307.

Finally, another method that is used is vacuum pinning. However, it is believed that vacuum pinning is very dependent on the usage of beads on either side of the extruded resin. For applications requiring minimal beads, beads on only one surface or no beads at all, vacuum pinning is difficult and may not work at all.

It has been observed that pinning at higher speeds requires higher current output by the pinning wire. This can be increased by raising the wire voltage, however, above a certain voltage arcing will occur between the wire and either the casting surface or the die. The above described methods have been employed to circumvent this limitation. However, none have been completely successful.

The present invention is a method that solves the above-described problems by using an electrically biased conductive shield in conjunction with a pinning wire so that the charging efficiency of the pinning apparatus can be controlled, resulting in improved pinning latitude with respect to polymer formulation and process speed.

SUMMARY OF THE INVENTION

The present invention is a method for pinning a cast sheet of polymeric film. The method includes the steps of extrusion casting a sheet of molten polymer from a die, directing the cast sheet onto a moving, chilled and electrically grounded surface to solidify the polymer and extending a conductive wire parallel to the width of the sheet with the sheet between the wire and the chilled surface before the sheet contacts the chilled surface. The method further includes extending an elongated conductive uninsulated shield parallel to the wire with the wire between the shield and the sheet, applying a bias voltage to the wire in the range of 6 to 15 kV; and adjusting a bias voltage of the shield at least 5 kV below the bias voltage of the wire to maintain a desired current flowing from the wire and the shield to the sheet.

In an alternate embodiment of the present invention, the method includes the further step of positioning the shield between the wire and the die.

The present invention has the advantage of providing a greater amount of net current or charge to the resin than with prior art methods. The present invention also has the advantage as opposed to the use of an insulated shield in the elimination of the dielectric insulation material and its requisite constraints of having a long life and high dielectric breakdown strength. Finally, the present invention has the advantage of greater control than prior art methods.

For a better understanding of the present invention, together with other and further objects, advantages and capabilities thereof reference is made to the following disclosure and appended claims in connection with the above-described drawings.

DETAILED DESCRIPTION OF THE PREFERRED EMBODIMENTS

Figure 1:
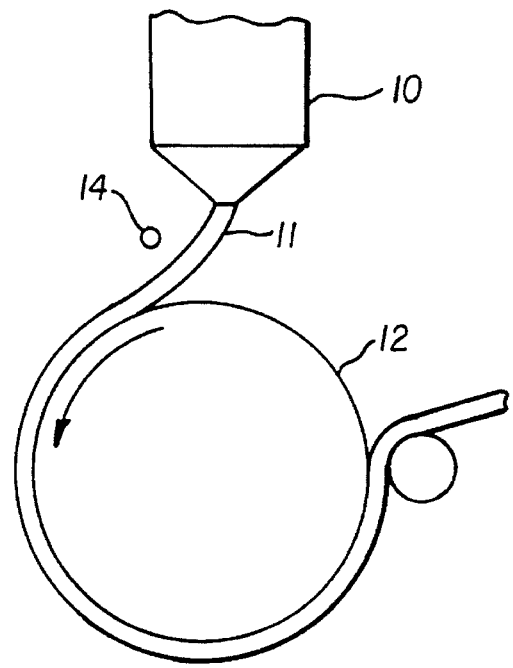
FIG. 1 is a schematic diagram of a casting process using a prior art electrostatic pinning wire.

Shown in FIG. 1 is a prior art device used for electrostatic pinning to improve adhesion of an extruded resin onto a grounded casting wheel in the production of plastic films such as polyethylene terephthalate (PET). The concept of electrostatic pinning is to spray electrical charge of one polarity onto the resin as it is extruded from the die. This is shown schematically in FIG. 1. An extrusion die 10 extrudes the polymeric resin 11 onto a casting wheel 12. A voltage is applied to pinning wire 14 which creates an electrostatic force between the resin and the casting wheel thereby preventing air entrainment in enabling the production of high quality films of polymeric resin. Key factors in this process are the pinning hardware used to charge the resin and the electrical resistivity of the resin.

Figure 2:
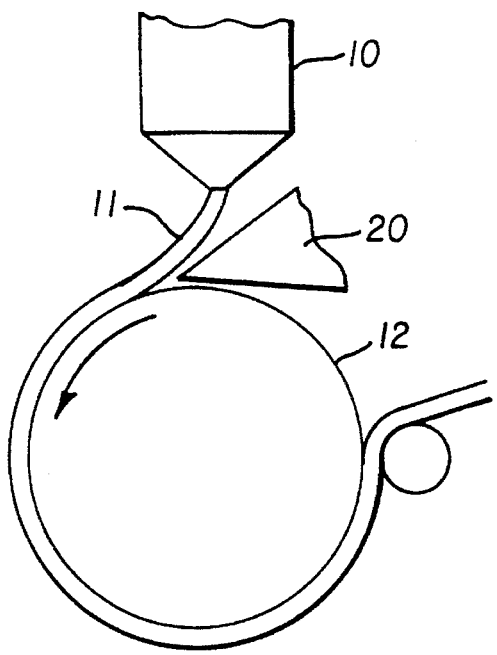
FIG. 2 is a schematic diagram of a casting process using a prior art vacuum pinning apparatus.

FIG. 2 shows an alternate method for pinning of the polymeric resin 11. A vacuum box 20 is used to create a vacuum behind the resin 11 as it extrudes from die 10. This vacuum eliminates the air boundary layer entrained by the casting wheel 12 allowing more uniform contact between the resin 11 and wheel 12. It is believed that vacuum pinning is very dependent on the usage of the beads on either side of the extruded resin 11. For applications requiring minimal beads, beads on only one surface or no beads at all, vacuum pinning is difficult and may not work at all.

Figure 3:
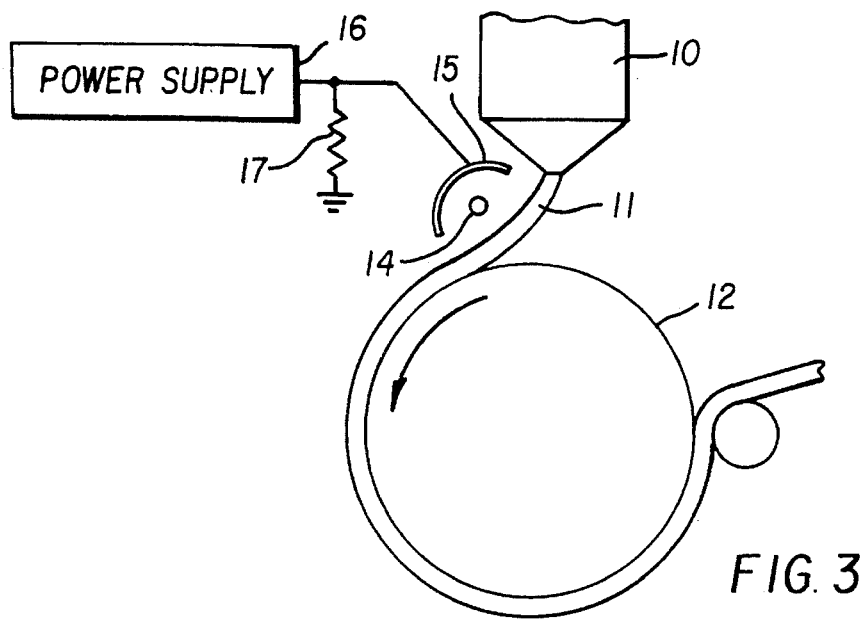
FIG. 3 is a schematic diagram of a casting process using the electrically biased conductive shield on electrostatic pinning wire of the present invention.

FIG. 3 shows the apparatus used in the present invention. An extrusion die 10 extrudes the polymeric resin 11 onto the casting wheel 12. A pinning wire 14 is located between the resin 11 and the casting wheel. A conductive shield 15 is located between the extrusion die and the pinning wire. However, rather than grounding or floating this shield 15, a power supply 16 is attached to the shield so as to be able to control the bias voltage of the shield 15. If necessary, a resistor 17 to ground may be placed in parallel with the power supply so as to sink current from the pinning wire 14.

Figure 4:
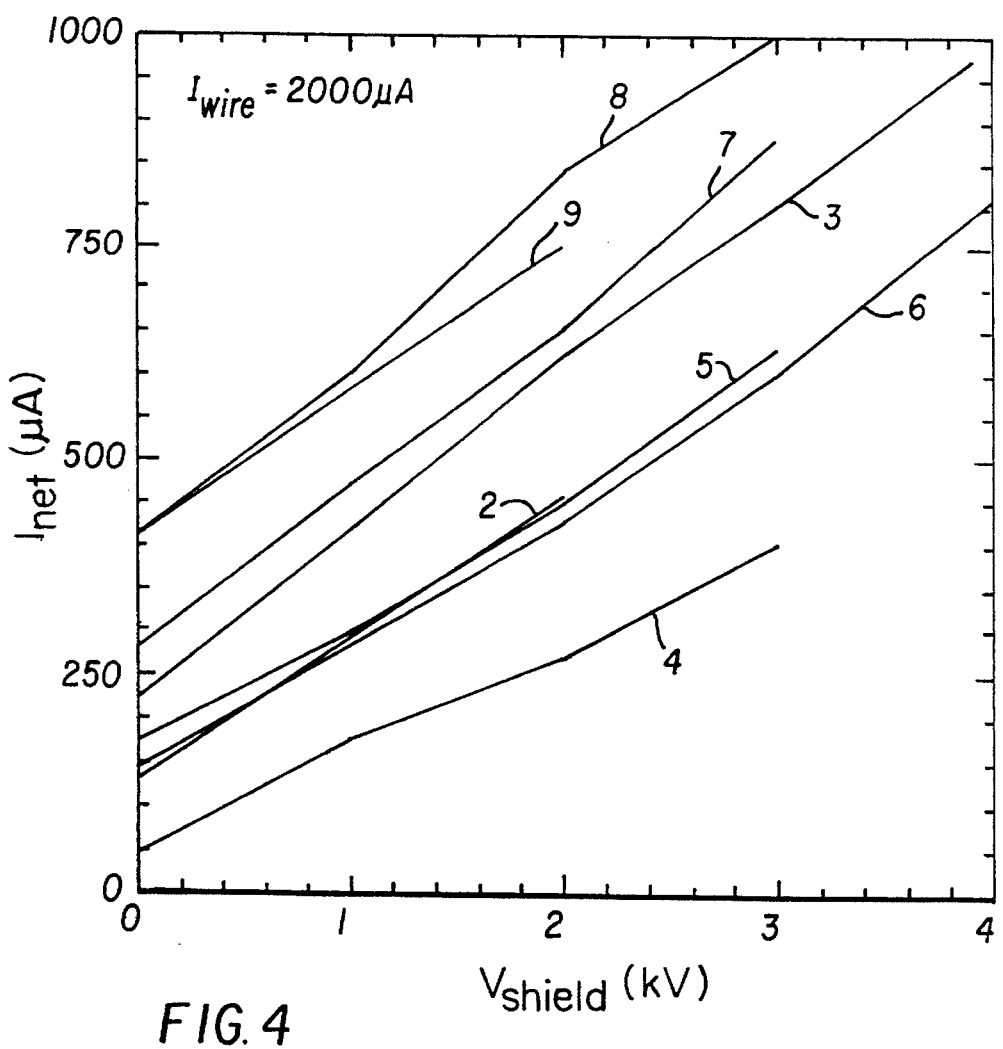
FIG. 4 is a graph showing the measured net current to polymer resin as a function of shield bias voltage for various resin formulations.

The advantage of this approach as opposed to a grounded shield such as described in U.S. Pat. No. 4,244,894, is the greater amount of net current (charge) available to the resin with a biased shield. The parameter of import is the charge deposited on the resin and a biased shield can deliver more charge, and therefore, operate more efficiently, than a grounded shield. This is demonstrated in FIG. 4, a plot of net current to the resin as a function of the bias voltage of the shield. For this experiment, a variety of polymeric resin formulations were each cast at 45 feet per minute at a thickness of 5 mil with a pinning wire less than or equal to 10 kV held at a constant current output of 2000 µA. The voltage to the wire was less than or equal to 10 kV. Typically, a grounded shield is only 10 percent efficient (roughly 200 µA) whereas a biased shield can be as high as 50 percent efficient (@4 kV). The bias shield should be physically isolated to protect operators. As shown in FIG. 4, the increase in charging efficiency occurs regardless of resin formulation. Therefore, a resin formulation that causes low net current values can be compensated for by increasing Vshield. Higher casting speeds require higher net currents and this is more easily achieved using the bias shield of the present invention rather than a grounded one.

The novel feature of the present invention is the realization that there is an optimal bias voltage for the shield that depends upon the pinning wire voltage but is significantly different from the pinning wire voltage and the ground potential. This is demonstrated by the following experiment.

The apparatus of FIG. 3, with shield 15 was used to pin a polymeric resin at 45 fpm at a 5 mil thickness. The pinning wire current was monitored with a Spellman high voltage power supply. Another Spellman high voltage power supply 16 was used to bias the shield 15 in parallel with a 600 kΩ resistor to ground. The current from the shield's power supply was also monitored. The current supplied by the power supply to the shield with the pinning wire off was used as a baseline and values obtained with the pinning wire energized provided a measure of the current to shield. The net current to the resin was computed as the difference between the pinning wire current and the previously computed current to shield.

The two parameters varied were pinning wire voltage and shield bias voltage. For a given shield bias, the pinning wire voltage was varied from 7 kV (a little above corona turn on) to 9.5 kV (limited value due to arcing) in 0.5 kV increments. This was done for shield bias voltages of 1, 1.5, 2, 3 and 4 kV. A contour plot of the net resin current data was generated. It is very clear that an optimal shield bias voltage (Vshield) exists for a given pinning wire voltage (Vwire) and this optimal voltage lies between 1 and 4 kV for the configuration tested. Also, the optimal Vshield appears to be a function of Vwire, increasing in a nonlinear fashion with increasing Vwire.

For a given resin, process speed and film thickness, there are two major effects of Vwire and Vshield in determining the net current to the resin. One is the amount of current produced by the pinning wire, the other is the number of electric field lines emanating from the wire and terminating on the resin. For a given Vwire, a low Vshield results in high wire current production but also a large number of field lines terminating on the shield rather than the resin. As Vshield is increased, wire current is reduced but more field lines terminate on the resin, tending to drive most of the current to the shield. If Vshield is too high wire current production is shut down completely. At the optimal Vshield the balance between shutting down wire current production and increasing the number of field lines terminating on the resin is maximized.

Pinning quality is directly related to net current going to the resin as demonstrated using a biased shield. At 45 fpm, 5 mil thick films are well pinned at net current levels of 4 to 8 µA/cm, depending upon resin formulation. There is variation among different resin formulations, presumably due to resin resistivity variations.

Increasing the bias voltage on a shield placed adjacent to the pinning wire improves the charging efficiency of the apparatus and can improve the robustness of the pinning device to resin resistivity variations. There is an optimal shield bias voltage that depends upon pinning wire voltage. Furthermore, it was demonstrated that there is an optimal shield bias voltage that is a function of pinning wire voltage.

The present invention is applicable to casting polymeric formulations at a variety of speeds. The invention works best if the bias voltage applied to the pinning wire is from 6 kV to 15 kV and the bias voltage applied to the shield is at least 5 kV lower than the bias voltage applied to the pinning wire.

While there has been shown and described what are at present considered the preferred embodiments of the present invention, it will be obvious to those skilled in the arts that various changes, alterations and modifications may be made therein without departing from the scope of the invention as defined by the following claims.

What is claimed is:

1. A method for pinning a cast sheet of polymeric film comprising:

extrusion casting a sheet of molten polymer from a die;

directing the cast sheet onto a moving chilled and electrically grounded surface to solidify the polymer;

extending a conductive wire transverse to a longitudinal axis of the sheet with the sheet between the wire and the chilled surface before the sheet contacts the chilled surface;

extending an elongated, conductive, uninsulated shield parallel to the wire with the wire between the shield and the sheet;

applying bias voltages to the wire and the shield, comprising the further steps of:

setting the bias voltage of the wire in the range of 7 to 10 kV; and adjusting the bias voltage of the shield in the range of 1 to 3 kV to maintain a desired current flowing from the wire and shield to the sheet.

2. A method according to claim 1, further comprising the step of positioning the shield between the wire and the die.

3. A method for pinning a cast sheet of polymeric film comprising:

extrusion casting a sheet of molten polymer from a die;

directing the cast sheet onto a moving chilled and electrically grounded surface to solidify the polymer;

extending a conductive wire traverse to a longitudinal axis of the sheet with the sheet between the wire and the chilled surface before the sheet contacts the chilled surface;

extending an elongated, conductive, uninsulated shield parallel to the wire with the wire between the shield and the sheet;

applying a first bias voltage to the wire in the range of 6 kV to 15 kV; and applying a second bias voltage to the shield at least 5 kV below the first bias voltage to maintain a desired current flowing from the wire and shield to the sheet.

4. The method according to claim 3, further comprising:

positioning the shield between the wire and the die.

* * * * *